United States Patent [19]
Shono

[11] 3,943,533
[45] Mar. 9, 1976

[54] LOCKING MECHANISM FOR INTERCHANGEABLE PENTAPRISM VIEW FINDER IN SINGLE LENS REFLEX CAMERA

[75] Inventor: Tetsuji Shono, Saitama, Japan

[73] Assignee: Asahi Kogaku Kogyo Kabushiki Kaisha, Tokyo, Japan

[22] Filed: Sept. 13, 1974

[21] Appl. No.: 505,714

[30] Foreign Application Priority Data
Sept. 20, 1973 Japan............................. 48-110017

[52] U.S. Cl................................. 354/156; 354/219
[51] Int. Cl.²......................................... G03B 19/12
[58] Field of Search....... 355/54, 56, 155, 156, 219, 355/60

[56] References Cited
UNITED STATES PATENTS
3,828,644  8/1974  Uchida.................................. 354/54

Primary Examiner—Richard A. Wintercorn
Attorney, Agent, or Firm—Wolder & Gross

[57] ABSTRACT

A single lens reflex camera of the interchangeable view finder type includes a pentaprism view finder having a casing provided with opposite followers slideably engaging grooves in parallel tracks on the camera body top wall. A lock element is mounted on a swingable arm carried by the view finder casing and is spring urged into locking engagement with a recess in one of the tracks. The view finder occular is provided with a coaxial collar rotatably supporting an unlock ring having a pin projecting through a slot into the casing and connected by a lost motion coupling to one end of a link which is connected to the swingable arm so rotation of the ring disengages the lock element from the lock recess.

7 Claims, 4 Drawing Figures

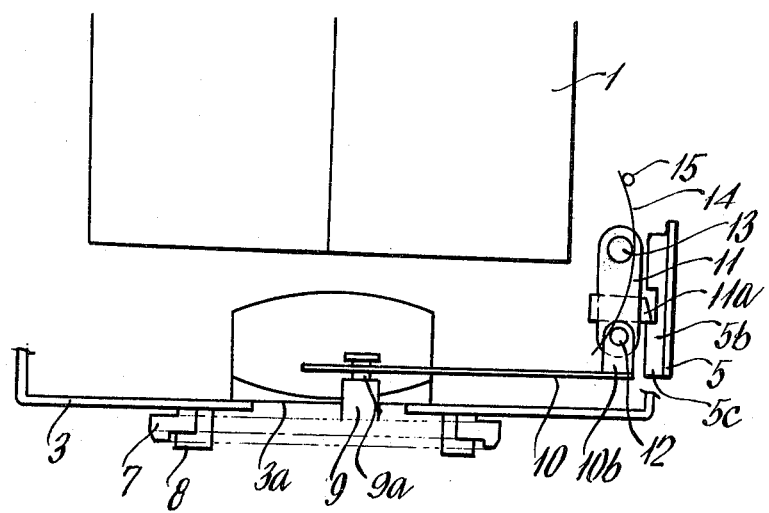
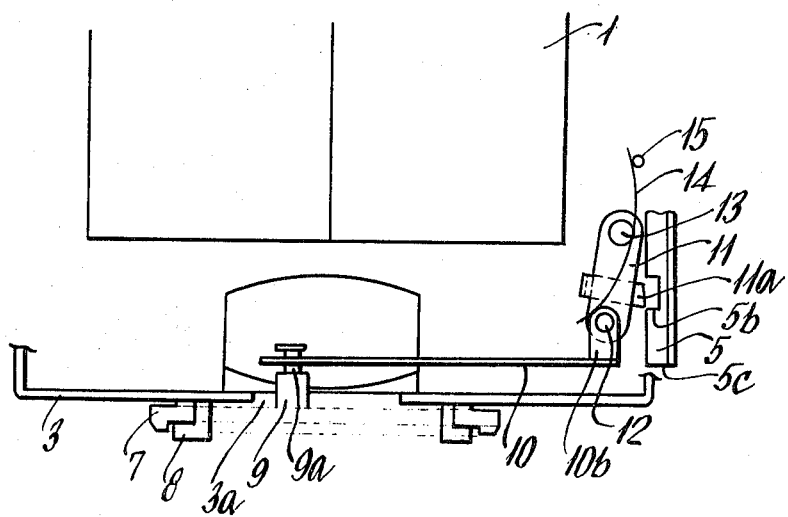

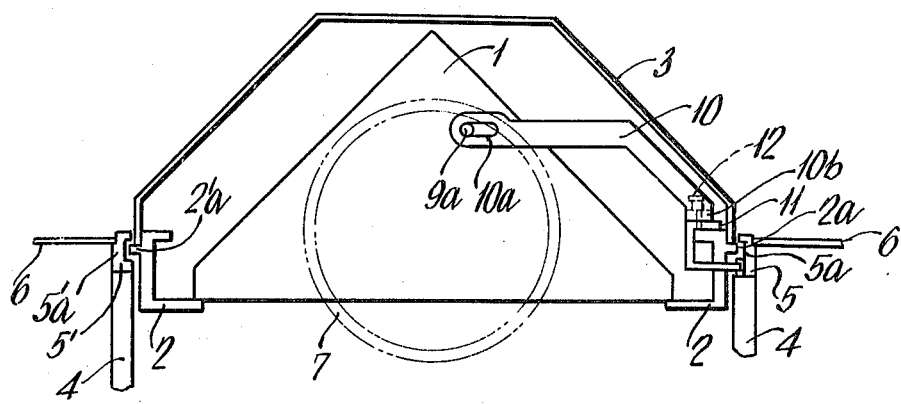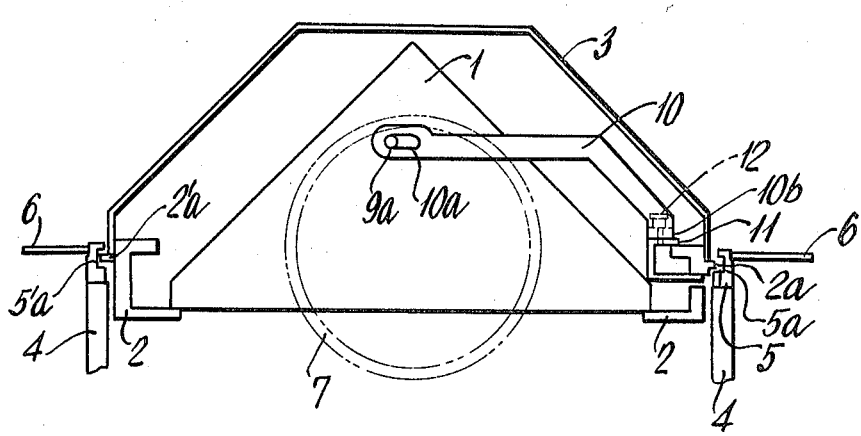

LOCKING MECHANISM FOR INTERCHANGEABLE PENTAPRISM VIEW FINDER IN SINGLE LENS REFLEX CAMERA

BACKGROUND OF THE INVENTION

The present invention relates generally to improvements in single lens reflex cameras, and it relates more particularly to a single lens reflex camera having an interchangeable view finder.

In a single lens reflex camera provided with an interchangeable view finder of the pentaprism type, it is necessary to releasably lock the view finder which is coupled to and mounted on the camera body to prevent its inadvertent displacement or separation from the camera body. However, the mechanisms heretofore provided for releasably locking a pentaprism view finder to the body of a camera possesses numerous drawbacks and disadvantages. They are generally unreliable mechanisms which contribute to the overall bulk of the camera, are frequently inconvenient and difficult to operate, are of little adaptability and versatility, and otherwise leave much to be desired.

SUMMARY OF THE INVENTION

It is an object of the present invention to provide an improved single lens reflex camera.

Another object of the present invention is to provide an improved single lens reflex camera provided with an interchangeable view finder.

Still another object of the present invention is to provide an improved mechanism for releasably locking a pentaprism view finder to the body of a camera.

A further object of the present invention is to provide a mechanism of the above nature characterized by its reliability, compactness, convenience, simplicity and ease of operation.

The above and other objects of the present invention will become apparent from a reading of the following description taken in conjunction with the accompanying drawings, which illustrate a preferred embodiment thereof.

The conventional pentaprism view finder section is not provided with such manually actuating means as film take-up and rewinding means, a shutter button, etc. which are provided on the camera main body. The only projecting portion of the view finder section is the eyepiece section. According to the present invention, a disengagement or unlocking ring is arranged around this projecting portion for disengagement action through rotation of this ring, so that there is obtained an advantage that no other projecting portion is needed for such disengaging action (the only projecting portion is the eyepiece section) and therefore the appearance of the view finder section is not impaired.

The present invention thus contemplates the provision of a single lens reflex camera comprising a camera body including an objective lens, a view finder separably coupled to the camera body and movable between a coupled condition and a separated condition, means for releasably locking the view finder in its coupled condition including a first locking section positioned on the camera body and a second locking section positioned on the view finder and moveable between positions of disengagement and locking engagement with the first locking section when the view finder is in its coupled condition and spring urged into locking engagement with the first locking section, and manually operable means positioned on the view finder for retracting the second locking section to its disengagement position.

In the preferred form of the improved camera, a pair of laterally spaced parallel tracks having channels in their confronting faces are located atop the camera body, one of the tracks having a recess containing section defining the first locking section. The view finder includes a casing housing a pentaprism and having laterally projecting follower members slideably engaging the track channels, a circular opening in its rear wall opposing the pentaprism rear surface, an eyepiece registering with the opening and a collar located on the casing rear wall coaxial with the eyepiece. The second locking section comprises a locking element or dog mounted on a lever swingably supported by the casing and spring biased to advance the locking element into engagement with the locking recess. A ring is rotatably mounted on the collar and is provided with a pin which projects through an arcuate slot in the casing rear wall into sliding engagement with a longitudinal slot formed in a link pin connected to the lever.

The improved mechanism is reliable, compact, convenient, easy to operate and of great versatility and adaptability.

BRIEF DESCRIPTION OF THE DRAWINGS

FIG. 1 is a fragmentary top plan view of the mechanism of a single lens reflex camera embodying the present invention illustrating the camera body and view finder in a coupled locked condition;

FIG. 2 is a view similar to FIG. 1 with the camera body and view finder shown in coupled unlocked condition;

FIG. 3 is a rear elevational view of that part of the camera as shown in FIG. 1; and FIG. 4 is a rear elevational view of that part of the camera as shown in FIG. 2.

DESCRIPTION OF THE PREFERRED EMBODIMENT

Referring now to the drawings which illustrate a preferred embodiment of the present invention, the reference numeral 1 generally designates a view finder pentaprism of conventional construction which is housed in a casing or view finder section cover 3 fixed to a view finder main body 2 forming a component of the casing 3. Associated with the interchangeable view finder is a camera main body 4 having laterally spaced upper parallel guide rails or tracks 5 and 5' which are provided in their confronting faces with grooves or channels 5a and 5'a which slideably engage projecting portions 2a and 2'of the view finder main body. 2. The camera main body 4 is provided with a main body cover 6 affixed to the main body 4. Affixed to the rear wall of the casing 3 is an eyepiece ring or collar 8 which registers with an opening in the casing rear wall and a manually operable unlock or disengagement ring 7 is telescoped by and rotatable on the ring 8. The pentaprism rear exit surface confronts the casing rear wall.

A pin 9 is fixed to the disengagement ring 7 and projects through a slot 3a in the rear wall of the cover 3 into the inside of the cover 3. The end portion 9a of the pin 9 loosely engages a slot or hole 10a in an intermediate lever or link 10. A pin 12 fixed to a lock lever 11 is pivoted to the other end portion 10b of the link or intermediate lever 10 remote from pin 9. The lever 11 is pivoted to the view finder section main body 2 by a supporting pin 13. In engagement with the pin 13 there is provided a return spring 14 whose one end engages an engagement or stop member 15 fixed to the view finder main body 2 and whose other end engages the pin 12, so that the lever 11 is urged in a counter-clockwise direction as viewed in FIGS. 1 and 2.

Considering now the manual operation of the improved mechanism described above from the condition of the locked connection of the view finder section with the camera main body (FIGS. 1 and 3) to the condition of disengagement (FIGS. 2 and 4), when, in the condition shown in FIG. 3, the disengagement or unlock ring 7 is manually rotated in a counter-clockwise direction, the pin 9a is moved to the left, so that the intermediate lever or link 10 moves to the left as viewed in FIG. 1 against the action of the spring 14. This causes the clockwise rotation of the lock lever 11 (FIG. 2), so that the engagement portion 11a of the lever 11 is disengaged from the engagement groove or recess 5b of the guide rail 5 and it is thereby possible to uncouple and remove the view finder section.

In attaching or coupling the view finder section to the camera main body the view finder section is brought into connection with the camera main body from behind (from below as viewed in FIGS. 1 and 2 and from above as viewed in FIGS. 3 and 4) in such a manner that the projecting portions 2a and 2'a are brought into engagement with the guide rail grooves 5a and 5'a, respectively. Further pushing into action causes the engagement portion 11a to be brought into contact with the end portion 5c of the guide rail 5 whereby the lever 11 is rotated in a clockwise direction as viewed in FIGS. 1 and 2, against the action of the spring 14. Accordingly, the intermediate lever 10 is moved left but, owing to the elongated configuration of the hole 10a, no influence is exerted upon the pin 9a and therefore the disengagement ring 7 is not rotated. The view finder section is pushed in up to the position shown in FIG. 2, when the action of the spring 14 causes the engagement portion 11a to enter the engagement groove 5b as seen in FIG. 1.

As mentioned above, according to the present invention, a disengagement means can be readily attached around the eyepiece ring of the view finder without impairing the appearance of the view finder section.

If the rotation ring around the eyepiece section of the view finder is also to perform a light-shield function, then the mechanism can be so constructed that rotation to the right from the neutral position causes such light-shield operation and rotation to the left causes the action of the means according to the present invention.

While there has been described and illustrated a preferred embodiment of the present invention, it is apparent that numerous alterations, omissions and additions may be made without departing from the spirit thereof.

I claim:

1. A single lens reflex camera comprising a camera main body, including an objective lens, a view finder separably connected to said camera main body and moveable between a coupled condition attached to said camera body in a position exposed to light traversing said objective lens and a separated condition detached and separated from said camera body, said view finder comprising a casing including a rear wall having an opening and a pentaprism housed in said casing and including a rear outlet surface and an eyepiece disposed rearwardly of said pentaprism rear surface and registering with said wall opening, means for releasably locking said view finder in said coupled condition including a first locking section positioned on said camera body and a second locking section positioned on said view finder and moveable between positions of disengagement and locking engagement with said first locking section when said view finder is in coupled condition and being resiliently urged into said locking engagement with said first locking section, and means for retracting said second locking section to its disengagement position, including a manually rotatable ring mounted on said casing rear wall in coaxial registry with said eyepiece and means coupling said ring and said second locking section whereby to move said second locking means between its position of disengagement and locking engagement with said first locking section with the respective opposite rotations of said ring.

2. The camera of claim 1 comprising a collar located on said rear wall coaxial with said eyepiece, said manually rotatable ring being supported by said collar.

3. The camera of claim 2 wherein said locking means comprises a lever swingably supported by said casing and having a locking element defining said second locking section mounted on and projecting from said lever and swingable therewith, said casing rear wall having an arcuate slot formed therein, a pin projecting axially from said ring through said arcuate slot and a link extending between said pin and lever whereby rotation of said ring swings said lever to retract said rocking element.

4. The camera of claim 3 wherein said first locking means includes a recess engaged by said locking element when said camera body and view finder are in a locked coupled condition.

5. The camera of claim 3 wherein said link has a longitudinal slot slideably engaged by said pin to define a lost motion connection between said pin and link.

6. The camera of claim 1 including a pair of laterally spaced parallel tracks positioned atop said camera body and having confronting channels formed therein, said casing having outwardly, laterally projecting follower elements slideably engaging said track channels.

7. A disengagement means for single lens reflex camera with interchangeable view finder in which, corresponding to an engagement part (5b) provided on the camera main body, the view finder section is provided with an engaging member (11) which is urged in the direction of engagement, a rotatable disengagement ring (7) is provided around the eyepiece ring (8) of the view finder, and the engagement member (11) and the disengagement ring (7) are coupled by a motion transmission mechanism to each other through the cover of the view finder section.

* * * * *